(12) United States Patent
Maloney et al.

(10) Patent No.: US 10,043,626 B1
(45) Date of Patent: Aug. 7, 2018

(54) ELECTRICAL SWITCHING APPARATUS ASSEMBLY, AND MODULE ASSEMBLY AND OPERATING METHOD THEREFOR

(71) Applicant: EATON CORPORATION, Cleveland, OH (US)

(72) Inventors: James Gerard Maloney, Industry, PA (US); Rajesh Kumar Reddy Appal, Oakdale, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/615,917

(22) Filed: Jun. 7, 2017

(51) Int. Cl.
*H01H 71/24* (2006.01)
*H01R 13/70* (2006.01)
*H01R 24/76* (2011.01)
*H02H 9/00* (2006.01)
*H01H 71/02* (2006.01)
*H02H 9/02* (2006.01)
*H01R 31/06* (2006.01)

(52) U.S. Cl.
CPC ........ *H01H 71/24* (2013.01); *H01H 71/0207* (2013.01); *H01H 71/0264* (2013.01); *H01R 13/70* (2013.01); *H01R 24/76* (2013.01); *H01R 31/065* (2013.01); *H02H 9/005* (2013.01); *H02H 9/02* (2013.01)

(58) Field of Classification Search
CPC .............. H01H 71/24; H01H 71/0207; H01H 71/0264; H02H 9/005; H02H 9/02; H01R 13/70; H01R 24/76; H01R 31/065
USPC ....................................................... 361/601
See application file for complete search history.

(56) References Cited

U.S. PATENT DOCUMENTS

| | | | | |
|---|---|---|---|---|
| 3,256,407 A | * | 6/1966 | Klein | H01H 71/1027 335/173 |
| 4,297,663 A | * | 10/1981 | Seymour | H01H 71/46 200/303 |
| 4,786,885 A | * | 11/1988 | Morris | H01H 83/20 200/309 |
| 4,806,893 A | * | 2/1989 | Castonguay | H01H 83/20 335/14 |
| 4,833,563 A | * | 5/1989 | Russell | H01H 71/0228 361/115 |
| 4,858,056 A | * | 8/1989 | Russell | H01H 83/20 361/42 |
| 4,860,157 A | * | 8/1989 | Russell | H01H 83/20 361/156 |
| 6,441,708 B1 | * | 8/2002 | Rodriguez | H01H 83/20 335/14 |

(Continued)

FOREIGN PATENT DOCUMENTS

GB 2288473 A * 10/1995 ............... G07C 3/00

*Primary Examiner* — Anatoly Vortman
(74) *Attorney, Agent, or Firm* — Eckert Seamans

(57) ABSTRACT

A module assembly is for an electrical switching apparatus assembly. The electrical switching apparatus assembly includes an electrical switching apparatus having a housing, a pair of separable contacts located internal with respect to the housing, and a shunt trip device for tripping open the pair of separable contacts. The module assembly includes a mounting member structured to be coupled to the housing, and an internet of things (IOT) module coupled to the mounting member. The IOT module is structured to be electrically connected to the shunt trip device in order to trip open the pair of separable contacts.

18 Claims, 8 Drawing Sheets

(56) References Cited

U.S. PATENT DOCUMENTS

| | | | |
|---|---|---|---|
| 7,829,808 B2 * | 11/2010 | Bogdon | H01H 71/0214 |
| | | | 200/293 |
| 7,909,508 B2 | 3/2011 | Maloney et al. | |
| 7,964,989 B1 * | 6/2011 | Puschnigg | G06F 1/266 |
| | | | 307/116 |
| 8,582,279 B2 | 11/2013 | Maloney et al. | |
| 9,466,451 B2 | 10/2016 | Carlino et al. | |
| 2016/0233605 A1 * | 8/2016 | Hernandez Ramirez | H02G 3/32 |
| 2016/0254628 A1 * | 9/2016 | Liao | H01R 27/02 |
| | | | 439/535 |

* cited by examiner

ELECTRICAL SWITCHING APPARATUS ASSEMBLY, AND MODULE ASSEMBLY AND OPERATING METHOD THEREFOR

BACKGROUND

Field

The disclosed concept relates generally to electrical switching apparatus assemblies such as, for example, electrical switching apparatus assemblies including circuit breakers. The disclosed concept also relates to module assemblies for electrical switching apparatus assemblies. The disclosed concept also relates to methods of operating electrical switching apparatus assemblies.

Background Information

Electrical switching apparatus, such as circuit breakers, are employed in diverse capacities. For example, load centers typically include a main circuit breaker capable of removing power from the entire load center, and further branch circuit breakers to remove power from selected circuits without removing power from the entire load center. A known problem with such circuit breakers is that if an operator desires to open separable contacts of the circuit breaker, the operator typically must manually move an operating handle from a closed position to an open position. This is inconvenient in situations where the operator is far away from the circuit breaker.

There is, therefore, room for improvement in electrical switching apparatus assemblies and in module assemblies therefor.

There is also room for improvement in methods of operating electrical switching apparatus assemblies therefor.

SUMMARY

These needs and others are met by embodiments of the disclosed concept, which are directed to an electrical switching apparatus assembly, and module assembly and operating method therefor.

As one aspect of the disclosed concept, a module assembly is provided for an electrical switching apparatus assembly. The electrical switching apparatus assembly includes an electrical switching apparatus having a housing, a pair of separable contacts located internal with respect to the housing, and a shunt trip device for tripping open the pair of separable contacts. The module assembly includes a mounting member structured to be coupled to the housing, and an internet of things (IOT) module coupled to the mounting member. The IOT module is structured to be electrically connected to the shunt trip device in order to trip open the pair of separable contacts.

As another aspect of the disclosed concept, an electrical switching apparatus assembly is provided. The electrical switching apparatus assembly includes an electrical switching apparatus having a housing, a pair of separable contacts located internal with respect to the housing, and a shunt trip device for tripping open the pair of separable contacts; and the aforementioned module assembly.

As another aspect of the disclosed concept, a method of operating an electrical switching apparatus assembly is provided. The method includes the steps of providing an electrical switching apparatus having a housing, a pair of separable contacts located internal with respect to the housing, and a shunt trip device for tripping open the pair of separable contacts; providing a module assembly comprising a mounting member coupled to the housing, and an IOT module coupled to the mounting member; electrically connecting the IOT module to the shunt trip device; and sending a signal to the IOT module with a wireless communication device in order to trip open the pair of separable contacts.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the statement that two or more parts or components "engage" one another shall mean that the parts exert a force against one another either directly or through one or more intermediate parts or components.

As employed herein, the term "coupling member" refers to any suitable connecting or tightening mechanism expressly including, but not limited to, zip ties, wire ties, rivets, screws, bolts, the combination of bolts and nuts (e.g., without limitation, lock nuts), and washers and nuts.

As employed herein, the term "internet of things (IOT) module" shall mean a self-contained device that is structured to receive a signal (e.g., without limitation, a wireless signal) and communicate the signal to an external system (e.g., without limitation, an electrical switching apparatus).

As employed herein, the term "shunt trip device" shall mean a built in mechanism of an electrical switching apparatus that functions to trip open separable contacts of the electrical switching apparatus in response to being energized.

Example 1

Figure 1:
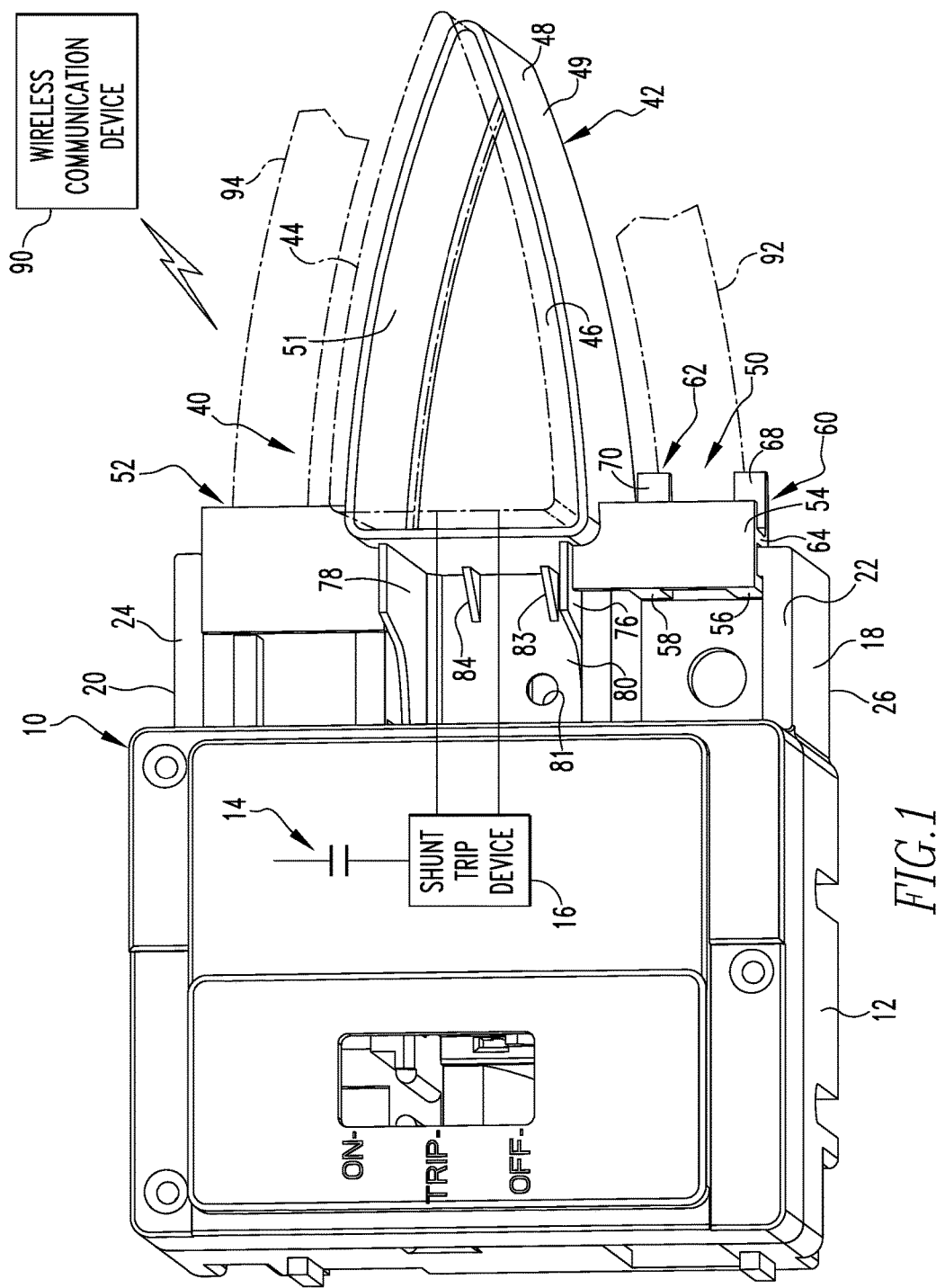
FIG. 1 is an isometric view of portions of an electrical switching apparatus assembly and module assembly therefor, and also showing a wireless communication device in simplified form, in accordance with one non-limiting embodiment of the disclosed concept.
Figure 2:
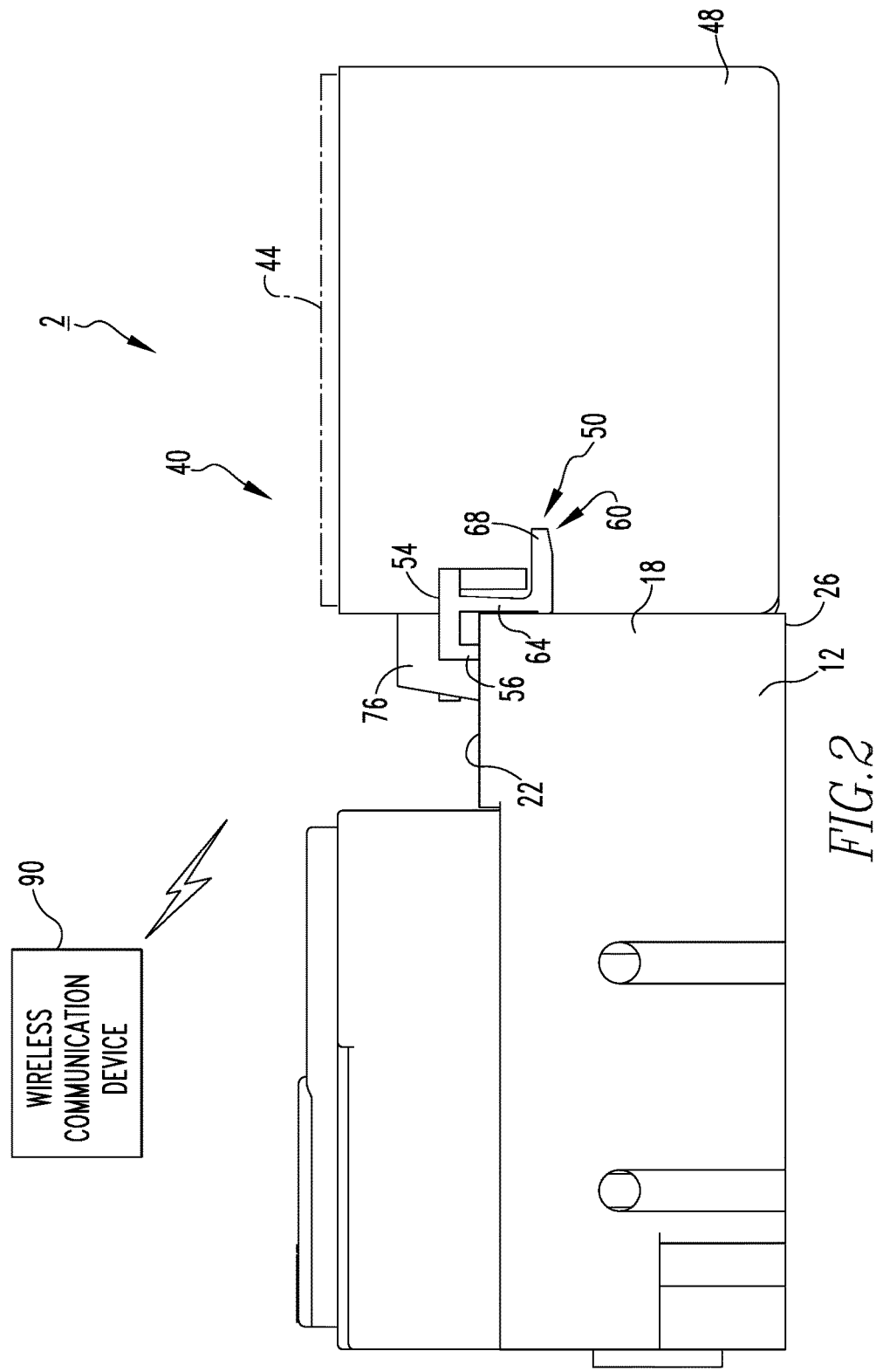
FIGS. 2 and 3 are side elevation and back isometric views, respectively, of the electrical switching apparatus assembly, module assembly therefor, and wireless communication device of FIG. 1.
Figure 3:
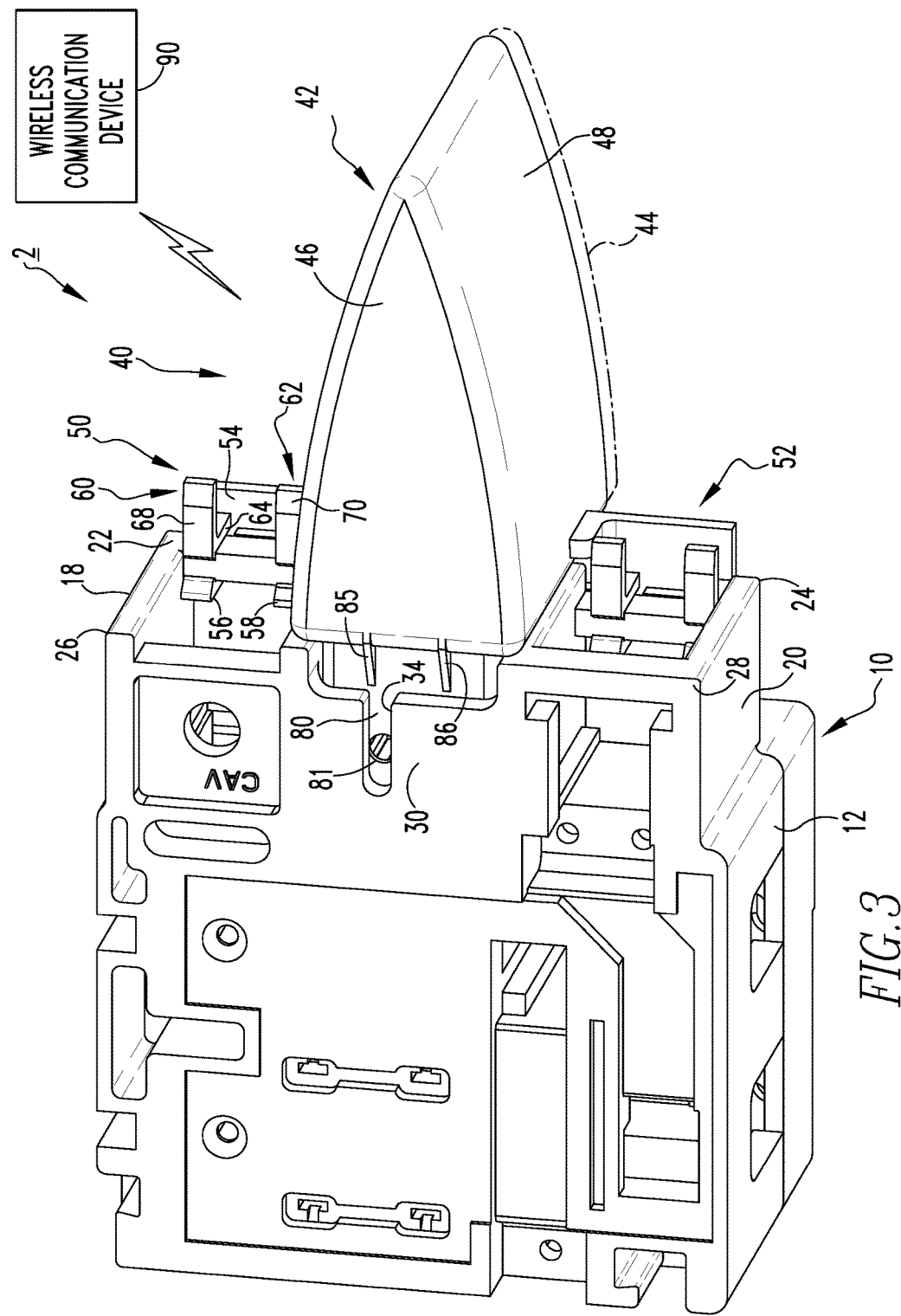

FIGS. 1-3 depict different partially simplified views of an electrical switching apparatus assembly 2, shown as employed with a wireless communication device 90 (shown in simplified form), in accordance with one non-limiting embodiment of the disclosed concept. The example electrical switching apparatus assembly 2 includes an electrical switching apparatus (e.g., without limitation, main circuit breaker 10) and a novel module assembly 40. It will be appreciated that certain components of the electrical switching apparatus assembly 2, such as for example and without limitation, the operating handle (not shown) of the main circuit breaker 10, are not shown or described for ease of illustration and economy of disclosure. The main circuit breaker 10 has a housing 12, a pair of separable contacts 14 (shown in simplified form in FIG. 1) located internal with respect to the housing 12, and a shunt trip device 16 (shown in simplified form in FIG. 1) for tripping open the pair of separable contacts 14. The module assembly 40 has a mounting member 42 and an internet of things (JOT) module 44 (shown in simplified form in phantom line drawing) coupled to the mounting member 42.

As will be discussed in greater detail below, the module assembly 40 advantageously allows the separable contacts 14 of the circuit breaker 10 to be tripped by the wireless communication device 90. As a result, operators no longer have to manually open the separable contacts 14, but can now do so remotely. Furthermore, the electrical switching apparatus assembly 2 and module assembly 40 therefor complies with Underwriters Laboratories ("UL") wire bending requirements, such as the UL 67 wire bending requirement.

Figure 4:
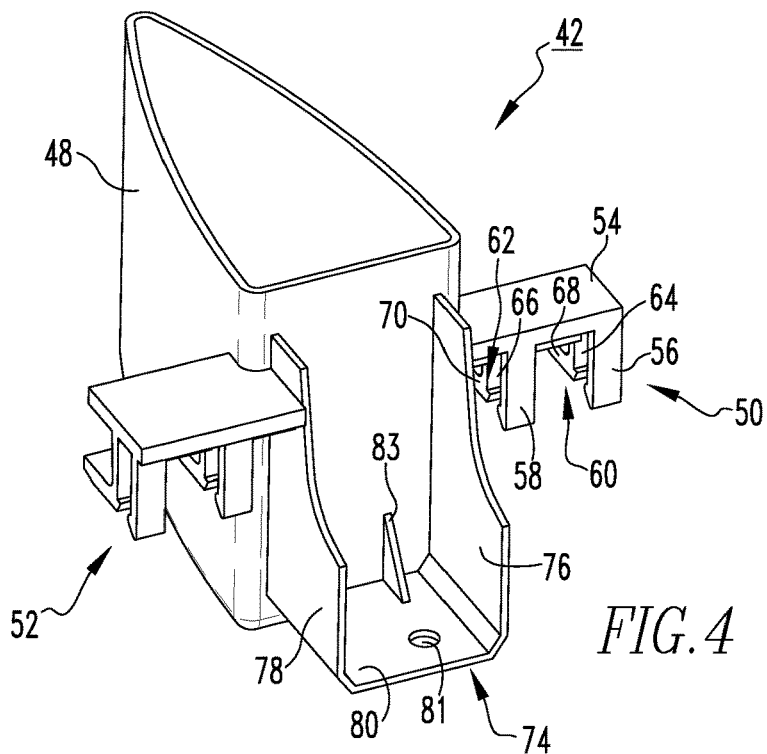
FIGS. 4 and 5 are isometric and plan views, respectively, of a mounting member for the electrical switching apparatus assembly and module assembly therefor of FIGS. 1-3.
Figure 5:
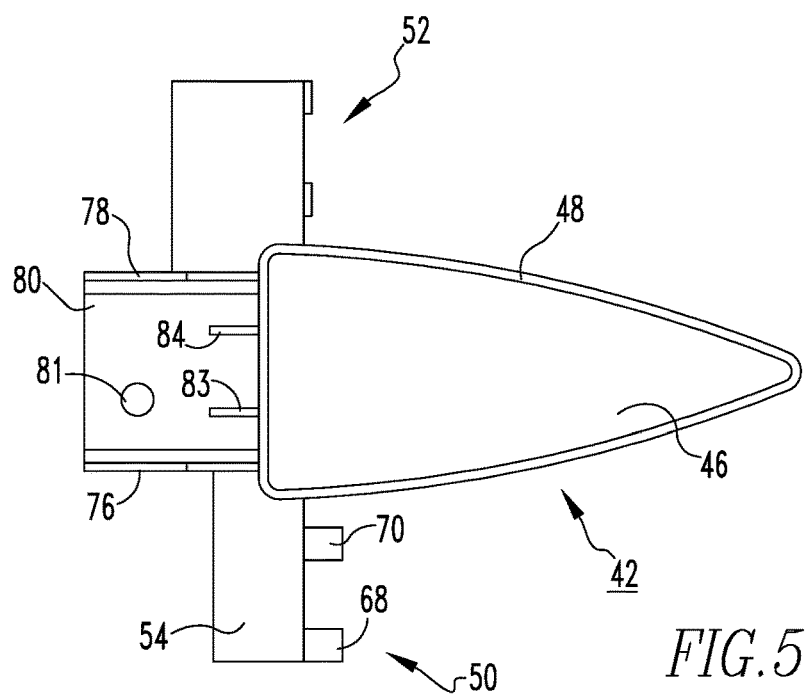

FIGS. 4 and 5 depict different views of the mounting member 42. The mounting member 42 may be made of any suitable material known in the art (e.g., without limitation, a polymeric material such as a thermoplastic). In one example embodiment, the mounting member 42 is a unitary component made from a single piece of material. For example and without limitation, the mounting member 42 may be a thermoplastic component made via an injection molding process.

The example mounting member 42 includes a generally planar floor portion 46, a peripheral wall portion 48 extending from and being located generally perpendicular with respect to the floor portion 46, a number of clip portions (two example clip portions 50,52 are shown in FIGS. 4 and 5) extending from the wall portion 48, and a securing portion 74 extending from the first clip portion 50 to the second clip portion 52. The wall portion 48 and the floor portion 46 cooperatively enclose the IOT module 44 (FIGS. 1-3), and the IOT module 44 is coupled to the wall portion 48 and the floor portion 46 by any suitable mechanism known in the art (e.g., without limitation, being press fit within, coupled to via coupling members, or otherwise affixed to). As such, the IOT module 44 is located internal with respect to the wall portion 48. The clip portions 50,52 and the securing portion 74, as will be discussed below, provide a mechanism to maintain the mounting member 42 on the housing 12 of the main circuit breaker 10. Although the mounting member 42 has two clip portions 50,52, for ease of illustration and economy of disclosure, only the clip portion 50 will be described in detail herein. It will, however, be appreciated that the clip portion 52 is structured substantially the same as the clip portion 50. Additionally, although the disclosed concept is being described in association with the clip portions 50,52, it will be appreciated that clip portions having suitable alternative configurations and/or geometries (not shown) are contemplated by the disclosed concept.

The clip portion 50 has a generally planar platform 54 extending from and being located generally perpendicular with respect to the wall portion 48, a number of legs (two example legs 56,58 are shown in FIG. 4) extending from and being located generally perpendicular with respect to the platform 54, and a corresponding number of retention members (two example retention members 60,62 are shown in FIG. 4) extending from the platform 54. Each of the retention members 60,62 includes a corresponding first leg (two example first legs 64,66 are shown in FIG. 4) extending from and being located generally perpendicular with respect to the platform 54, and a corresponding second leg (two example second legs 68,70 are shown in FIG. 4) extending from the corresponding first legs 64,66. Each of the legs 56,58 is opposite and aligned with a corresponding one of the legs 64,66.

Continuing to refer to FIGS. 4 and 5, the securing portion 74 includes a number of planar portions 76,78,80 each extending from and being located generally perpendicular to the wall portion 48. The first planar portion 76 extends from the first clip portion 50. The second planar portion 78 extends from the second clip portion 52. The first planar portion 76 is opposite the second planar portion 78. The third planar portion 80 extends from the first planar portion 76 to the second planar portion 78 and is located generally perpendicular to the first planar portion 76 and the second planar portion 78. Furthermore, the third planar portion has a slot 81.

Figure 6:
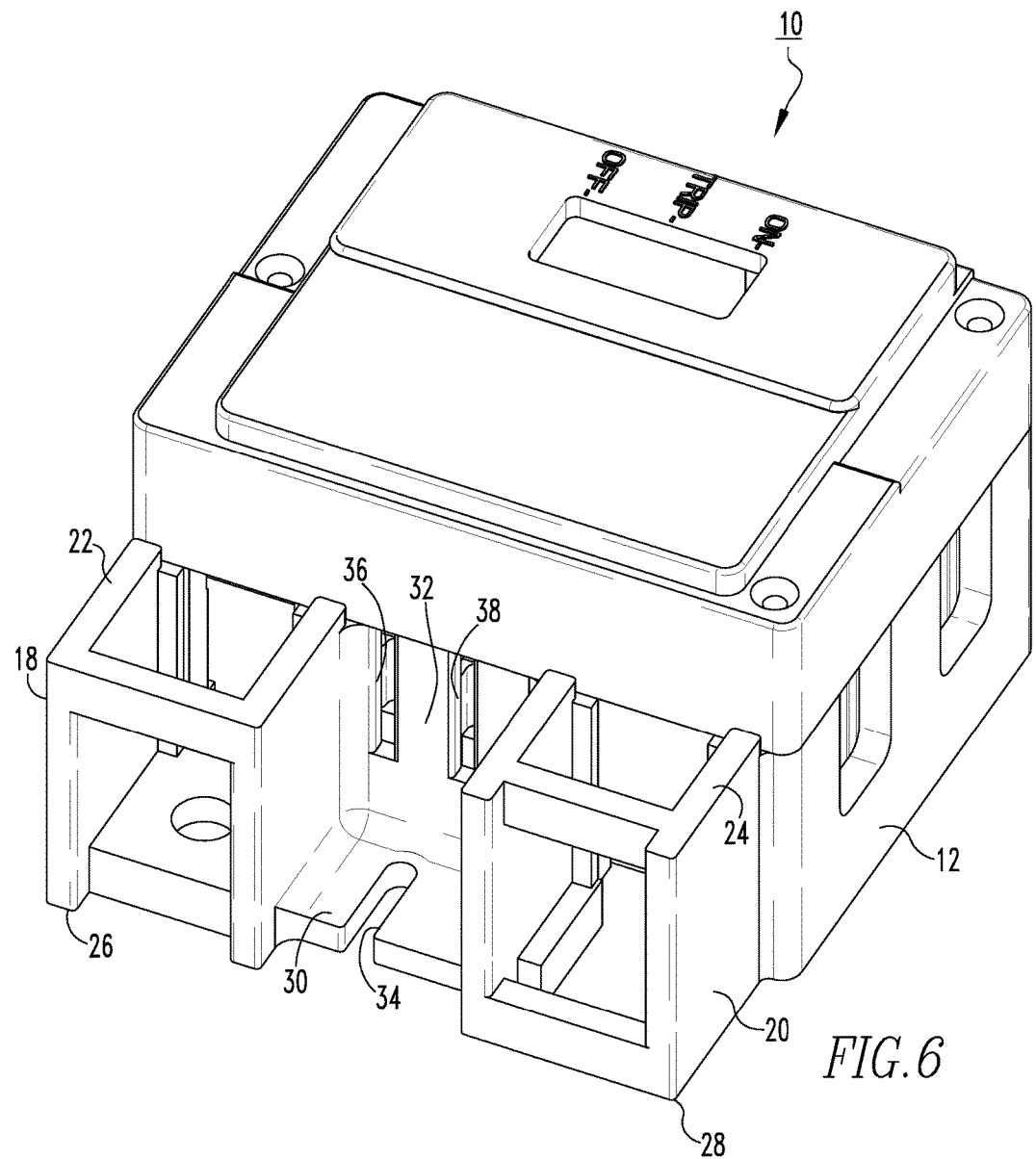
FIG. 6 is an isometric view of portions of an electrical switching apparatus for the electrical switching apparatus assembly and module assembly therefor of FIGS. 1-3.

FIG. 6 shows an isometric view of the main circuit breaker 10. As shown, the housing 12 includes a first terminal portion 18 and a second terminal portion 20 each having an opening structured to receive a conductor (not shown). The terminal portions 18,20 include corresponding first end portions 22,24 and corresponding second end portions 26,28 opposite the first end portions 22,24 such that the openings of the terminal portions 18,20 are located therebetween. The housing 12 further includes a first planar portion 30 and a second planar portion 32 each extending from the first terminal portion to the second terminal portion 20. The planar portion 30 has a slot 34 and the planar portion 32 has a number of slots (two example slots 36,38 are shown in FIG. 6).

In one example embodiment, the mounting member 42 further includes a number of support portions (two example support portions 83,84 are shown in FIGS. 4 and 5 and two example support portions 85,86 are shown in FIG. 3) for strengthening the connection between the floor and wall portions 46,48, and the securing portion 74. More specifically, as shown in FIGS. 4 and 5, the support portions 83,84 extend from the wall portion 48 to the third planar portion 80. As shown in FIG. 3, the support portions 85,86 extend from the floor and wall portions 46,48, to the third planar portion 80.

As stated above, the clip portions 50,52 and the securing portion 74 provide a mechanism by which the mounting member 42 can be mounted to the housing 12 of the main circuit breaker 10. More specifically, and with reference to FIG. 3, it will be appreciated that the legs 56,58,64,66 are biased toward engagement with the first terminal portion 18 of the housing 12 of the main circuit breaker 10. Accordingly, as best seen in FIG. 3, the first end 22 of the first terminal portion 18 is located between the legs 56,64 and between the legs 58,66. As such, in order to mount the mounting member 42 to the main circuit breaker 10, the legs 68,70 can be moved away from the legs 56,58 by an operator, and the first end 22 of the first terminal portion 18 can be inserted therebetween. Upon release of the legs 68,70, the legs 56,58,64,66, which are biased toward engagement with the housing 12, will provide a mechanism to maintain the mounting member 42 on the housing 12. Employing two opposing pairs of legs 56,64 and 58,66 on the single clip portion 50 provides additional advantages in terms of retention of the mounting member 42 on the housing 12. Additionally, the clip portion 52 is mounted to the second terminal portion 20 in substantially the same manner as the clip portion 50.

Continuing to refer to FIG. 3, the planar portion 80 overlays, engages, and is generally parallel with the planar portion 30. Additionally, the slot 34 is aligned with the slot 81 in order to provide a pathway therethrough. Accordingly, it will be appreciated that by inserting a suitable coupling member through the slots 34,81, the mounting member 42 is further structured to be reliably mounted to the main circuit breaker 10.

The functionality of the module assembly 40 in conjunction with the main circuit breaker 10 will now be discussed in greater detail. Referring to FIG. 1, it will be appreciated that the IOT module 44 is electrically connected with the shunt trip device 16 in order to trip open the separable contacts 14. That is, electrical conductors (e.g., without limitation, wires) extend from the IOT module 44 through the slots 36,38 (FIG. 6) of the main circuit breaker 10 to the shunt trip device 16 such that a signal from the IOT module 44 will cause the shunt trip device 16 to trip open the separable contacts 14. The wireless communication device 90, which may be, for example and without limitation, a tablet, cell phone, or the like, is structured to send the signal to the IOT module 44 to trip open the separable contacts 14. As such, an operator who is far away (i.e., more than 5 meters) from the main circuit breaker 10 can cause the separable contacts 14 of the main circuit breaker 10 to trip open by sending a signal with the wireless communication device 90 to the IOT module 44. In other words, opening of the separable contacts 14 in the absence of a fault condition can be accomplished without the operator having to move a main operating handle of the main circuit breaker 10. This saves time and energy for the operator, who would otherwise have to manually open the separable contacts 14 via the operating handle of the main circuit breaker 10. Additionally, because the circuit breaker 10 is a main circuit breaker 10, it will be appreciated that the disclosed concept provides a method by which the operator can trip all circuit breakers (i.e., all branch circuit breakers (not shown)) in a load center which employs the main circuit breaker 10.

It will thus be appreciated that a method of operating an electrical switching apparatus assembly 2 includes the steps of providing a main circuit breaker 10 with a housing 12, a pair of separable contacts 14 located internal with respect to the housing 12, and a shunt trip device 16 for tripping open the pair of separable contacts 14; providing a module assembly 40 including a mounting member 42 mounted to the housing 12, and an IOT module 44 coupled to the mounting member 42; electrically connecting the IOT module 44 to the shunt trip device 16; and sending a signal to the IOT module 44 with a wireless communication device 90 in order to trip open the pair of separable contacts 14.

It will also be appreciated that the disclosed concept provides a mechanism to comply with UL 67 wire bending requirements. More specifically, in the instant example embodiment, the floor portion 46 is generally triangular-shaped and the IOT module 44 is shaped according to the floor portion 46. As shown in FIG. 2, the wall portion 48 extends from the second end portion 26 past the first end portion 22. However, despite the fact that the mounting member 42 spans the length of the terminal portions 18,20, wires are advantageously able to be accommodated by the module assembly 40 without significant bending. Referring to FIG. 1, it will be appreciated that a wire (see, for example, a portion of a wire 92, shown in simplified form in phantom line drawing) extending out of the terminal portion 18 will have a radius of curvature no smaller than the radius of curvature of a lower portion 49 of the wall portion 48. Similarly, a wire (see, for example, a portion of a wire 94, shown in simplified form in phantom line drawing) extending out of the terminal portion 20 will have a radius of curvature no smaller than the radius of curvature of an upper portion 51 of the wall portion 48. As shown, the wires 92,94 have a relatively large radius of curvature and substantially no sharp bends as a result of the novel shape of the mounting member 42 being devoid of any sharp corners. As a result, UL 67 wire bending requirements are advantageously able to be satisfied.

Example 2

Figure 7:
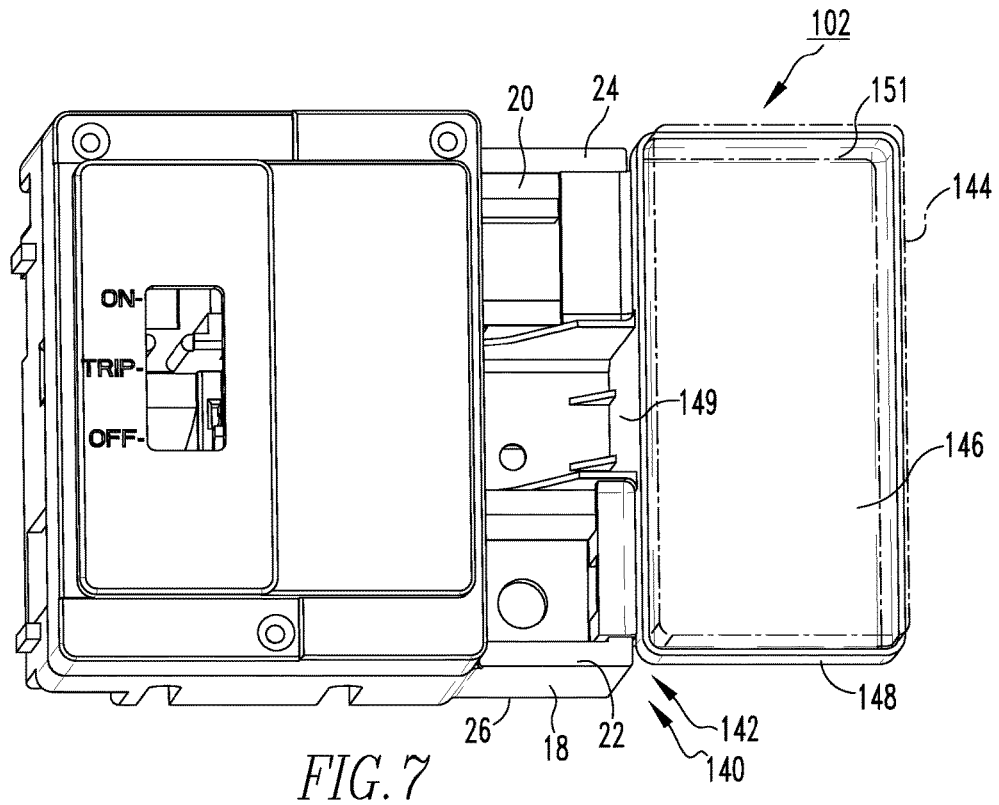
FIGS. 7-9 are front isometric, side elevation, and back isometric views, respectively, of another electrical switching apparatus assembly and module assembly therefor, in accordance with another non-limiting embodiment of the disclosed concept.
Figure 8:
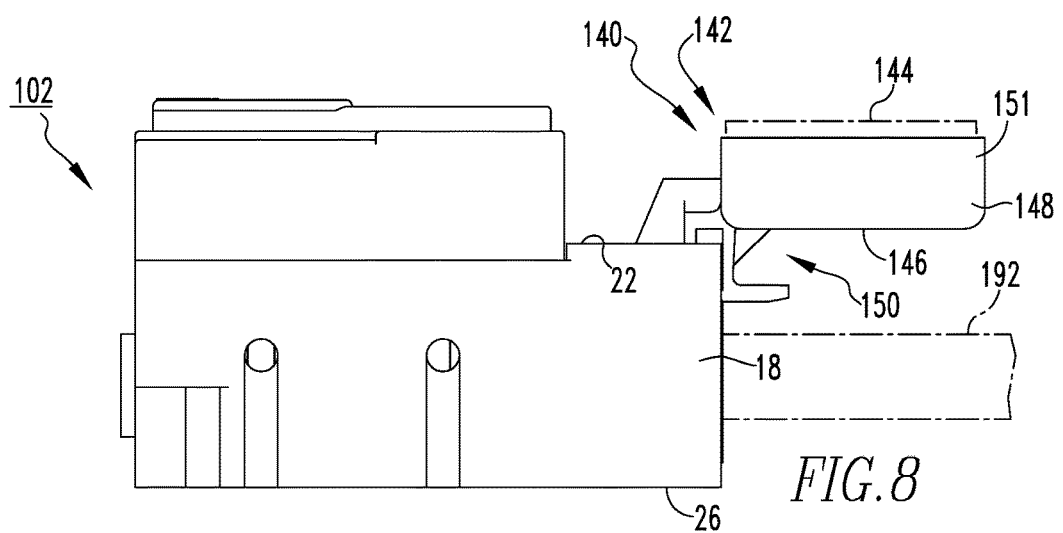
Figure 9:
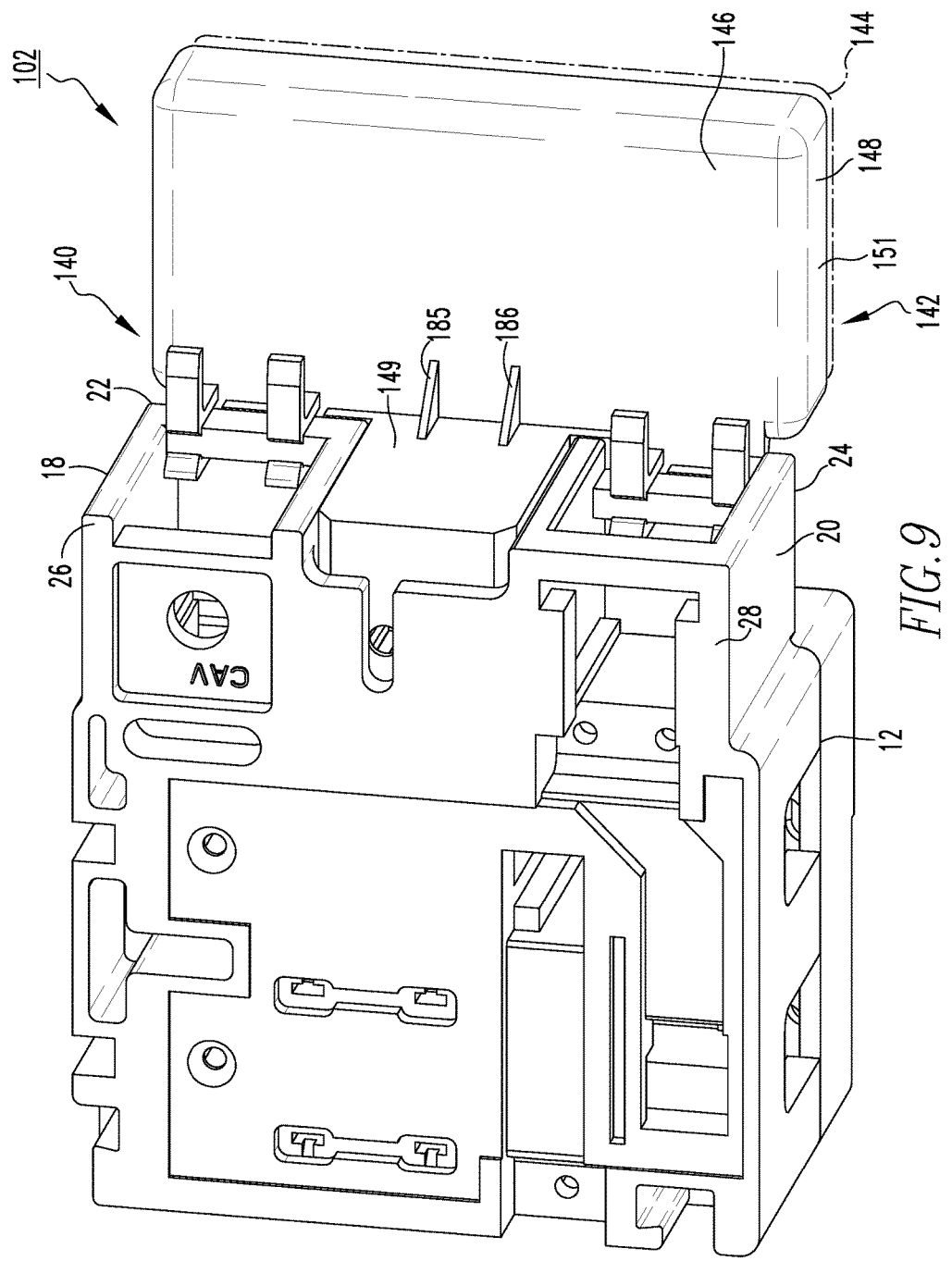
Figure 10:
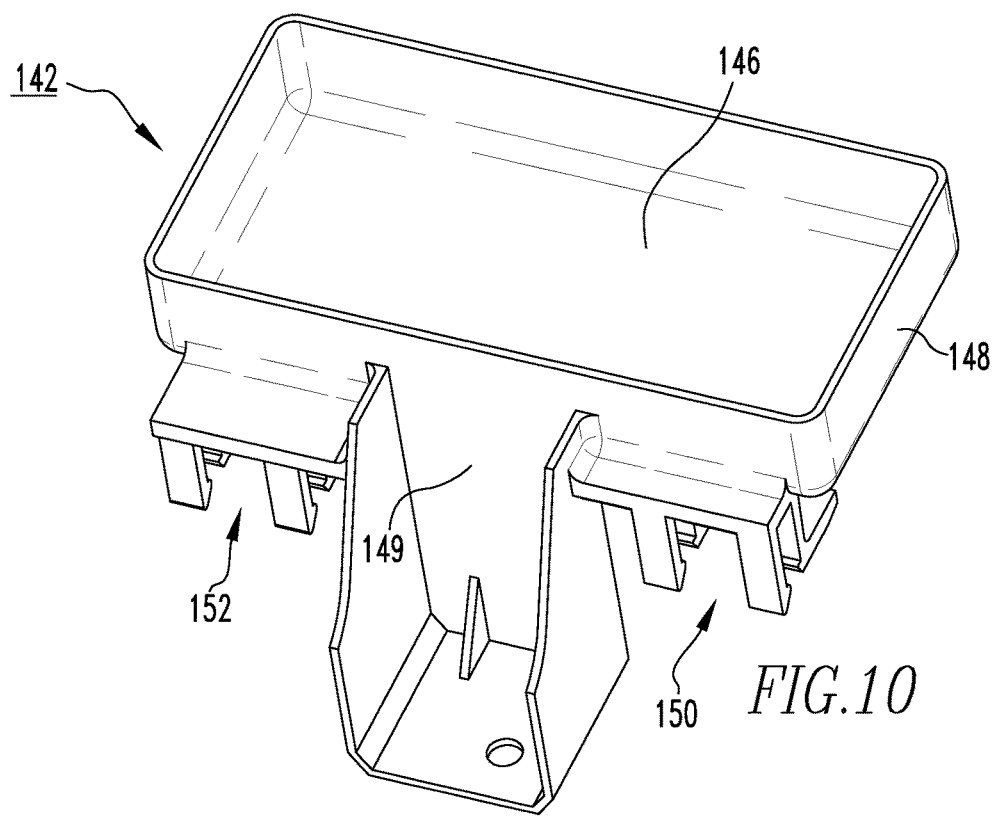
FIGS. 10 and 11 are isometric and elevation views, respectively, of a mounting member for the electrical switching apparatus assembly and module assembly therefor of FIGS. 7-9.
Figure 11:
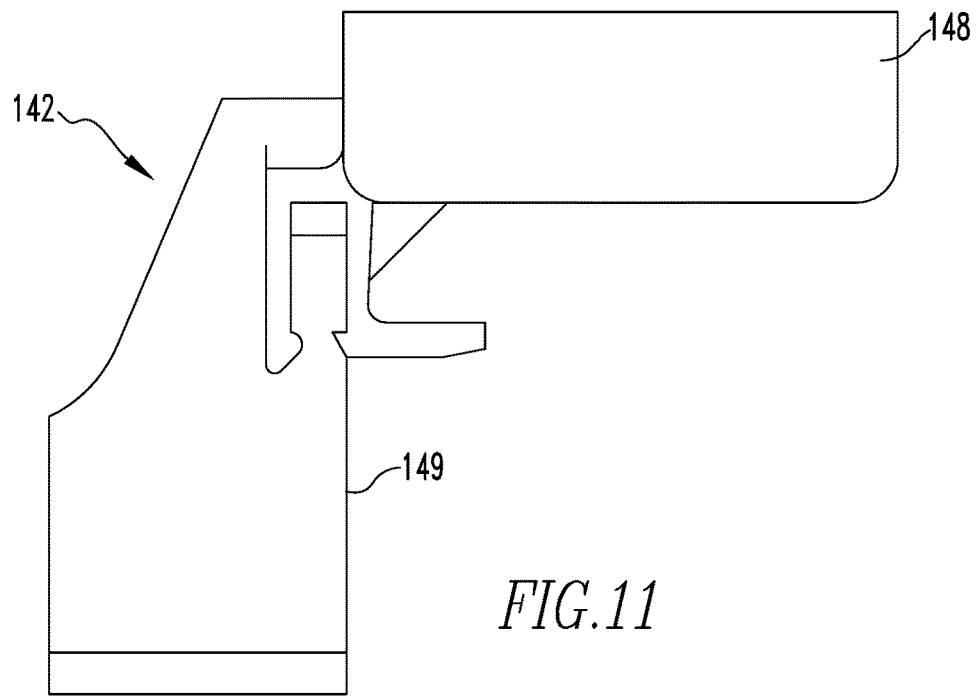

FIGS. 7-9 show different views of another example electrical switching apparatus assembly 102, and FIGS. 10 and 11 show different views of a mounting member 142 for the electrical switching apparatus assembly 102, in accordance with another non-limiting embodiment of the disclosed concept. As shown in FIG. 7, the floor portion 146 is generally rectangular-shaped and the IOT module 144 (shown in simplified form in phantom line drawing) is shaped according to the floor portion 146. As shown, the floor portion 146 and the wall portion 148 extend from the first end portion 22 of the first terminal portion 18 to the first end portion 24 of the second terminal portion 20. The wall portion 148 extends from the floor portion 146 away from the terminal portions 18,20. Referring to FIG. 9, the wall portion 148 has an extension portion 149 and a body portion 151 each extending from the floor portion 146 in opposing directions. The IOT module 144 is located internal with respect to the body portion 151. The support portions 185,186 extend from the floor portion 146 and the extension portion 149.

It will be appreciated that the electrical switching apparatus assembly 102 and module assembly 140 therefor, like the electrical switching apparatus assembly 2 and module assembly 40 therefor discussed above, is likewise structured to comply with UL 67 wire bending requirements. More specifically, the clip portions 150,152, which extend from the floor portion 146, are mounted to the first end portions 22,24 and the body portion 151 is substantially located above the first end portions 22,24, from the orientation of FIG. 8. As such, as shown in FIG. 8, a wire (see, for example, a portion of a wire 192, shown in simplified form in phantom line drawing) extending from the terminal portions 18,20 (i.e., extending below the floor portion 146 with respect to the orientation of FIG. 8), will have very little, if any, interference from the module assembly 140.

Although the disclosed concept has been described herein in association with the mounting members 42,142 and the IOT modules 44,144, it will be appreciated that mounting members and IOT modules having suitable alternative geometries (not shown) are contemplated herein. Additionally, although the disclosed concept has been described in association with tripping the separable contacts 14 of the main circuit breaker 10, it will be appreciated that similar suitable alternative module assemblies may be employed to trip individual branch circuit breakers (not shown).

Accordingly, it will be appreciated that the disclosed concept provides for an improved (e.g., without limitation, more efficient) electrical switching apparatus assembly 2,102, and module assembly 40,140 and operating method therefor, in which a wireless communication device 90 may be employed to trip open a pair of separable contacts 14 of an electrical switching apparatus 10. This provides a mechanism by which an operator can trip open the electrical switching apparatus 10 from a remote location, thus saving time and minimizing and/or eliminating the inconvenience that would be associated with having to manually open the separable contacts 14.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A module assembly for an electrical switching apparatus assembly, said electrical switching apparatus assembly comprising an electrical switching apparatus having a housing, a pair of separable contacts disposed internal with respect to said housing, and a shunt trip device for tripping open said pair of separable contacts, said module assembly comprising:
    a mounting member mounted to said housing; and
    an IOT module coupled to said mounting member,
    wherein said IOT module is electrically connected to said shunt trip device in order to trip open said pair of separable contacts; wherein said mounting member comprises a floor portion and a wall portion extending from said floor portion; and wherein said IOT module is disposed internal with respect to said wall portion.

2. The module assembly of claim 1 wherein said mounting member further comprises a number of clip portions extending from at least one of said floor portion and said wall portion; and wherein said number of clip portions are mounted to said housing.

3. The module assembly of claim 2 wherein each of said number of clip portions comprises a first leg and a second leg disposed opposite said first leg; and wherein said first leg and said second leg are biased toward engagement with said housing.

4. The module assembly of claim 2 wherein said number of clip portions comprises a first clip portion and a second clip portion; wherein said mounting member further comprises a securing portion extending from said first clip portion to said second clip portion; and wherein said securing portion is mounted to said housing.

5. The module assembly of claim 4 wherein said securing portion comprises a first planar portion, a second planar portion disposed opposite said first planar portion, and a third planar portion extending from said first planar portion to said second planar portion and being disposed generally perpendicular to said first planar portion and said second planar portion; wherein said first planar portion extends from said first clip portion; and wherein said second planar portion extends from said second clip portion.

6. The module assembly of claim 5 wherein said mounting member further comprises a support portion extending from said wall portion and said third planar portion.

7. The module assembly of claim 5 wherein said wall portion comprises an extension portion and a body portion each extending from said floor portion in opposing directions; wherein said IOT module is disposed internal with respect to said body portion; and wherein said mounting member further comprises a number of support portions extending from said floor portion and said extension portion.

8. The module assembly of claim 2 wherein said floor portion is generally triangular-shaped; and wherein said IOT module is shaped according to said floor portion.

9. The module assembly of claim 2 wherein said floor portion is generally rectangular-shaped; and wherein said IOT module is shaped according to said floor portion.

10. An electrical switching apparatus assembly comprising:
    an electrical switching apparatus having a housing, a pair of separable contacts disposed internal with respect to said housing, and a shunt trip device for tripping open said pair of separable contacts; and
    a module assembly comprising:
       a mounting member coupled to said housing, and
       an IOT module coupled to said mounting member,
       wherein said IOT module is electrically connected to said shunt trip device in order to trip open said pair of separable contacts; wherein said mounting member comprises a floor portion, a wall portion extending from said floor portion, and a securing portion extending from at least one of said floor portion and said wall portion; wherein said IOT module is disposed internal with respect to said wall portion; and wherein said securing portion is mounted to said housing.

11. The electrical switching apparatus assembly of claim 10 wherein said housing comprises a planar portion having a slot; wherein said securing portion comprises a planar portion having a slot; wherein said planar portion of said securing portion overlays and is generally parallel with said planar portion of said housing; and wherein the slot of said housing is aligned with the slot of said securing portion in order to provide a pathway therethrough.

12. The electrical switching apparatus assembly of claim 11 wherein said electrical switching apparatus is a main circuit breaker.

13. The electrical switching apparatus assembly of claim 10 wherein said mounting member further comprises a number of clip portions extending from at least one of said floor portion and said wall portion; and wherein said number of clip portions are mounted to said housing.

14. The electrical switching apparatus assembly of claim 13 wherein each of said number of clip portions comprises a first leg and a second leg disposed opposite said first leg; and wherein said first leg and said second leg engage said housing and are biased toward engagement with said housing.

15. The electrical switching apparatus assembly of claim 13 wherein said housing comprises a first terminal portion and a second terminal portion each having an opening receiving a conductor; wherein said number of clip portions comprises a first clip portion and a second clip portion; wherein said first clip portion is mounted to said first terminal portion; and wherein said second clip portion is mounted to said second terminal portion.

16. The electrical switching apparatus assembly of claim 10 wherein said housing comprises a first terminal portion and a second terminal portion each having an opening receiving a conductor; wherein each of said first terminal portion and said second terminal portion comprises a first end portion and a second end portion opposite said first end portion such that the opening is disposed therebetween; wherein said floor portion extends from said first end portion of said first terminal portion to said first end portion of said second terminal portion; and wherein said wall portion comprises a body portion extending from said floor portion away from said first terminal portion and said second terminal portion.

17. The electrical switching apparatus assembly of claim 10 wherein said housing has a number of slots through which said IOT module is electrically connected to said shunt trip device.

18. A method of operating an electrical switching apparatus assembly comprising the steps of:
   providing an electrical switching apparatus having a housing, a pair of separable contacts disposed internal with respect to said housing, and a shunt trip device for tripping open said pair of separable contacts;
   providing a module assembly comprising a mounting member mounted to said housing, and an IOT module coupled to said mounting member, said mounting member comprising a floor portion and a wall portion extending from said floor portion, said IOT module being disposed internal with respect to said wall portion;
   electrically connecting said IOT module to said shunt trip device; and
   sending a signal to said IOT module with a wireless communication device in order to trip open said pair of separable contacts.

* * * * *